Dec. 7, 1943.  W. W. O'NEAL ET AL  2,335,877
FURNACE
Filed Jan. 17, 1942  3 Sheets-Sheet 3

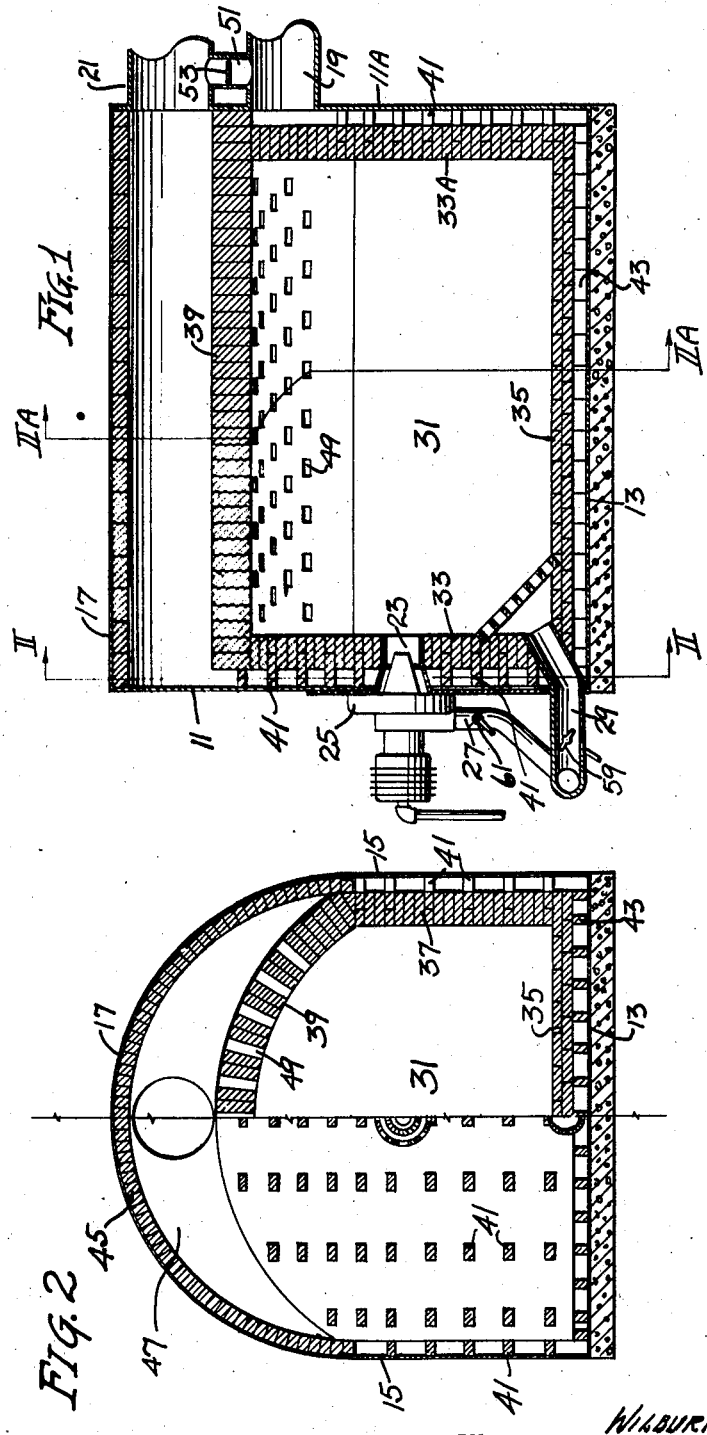

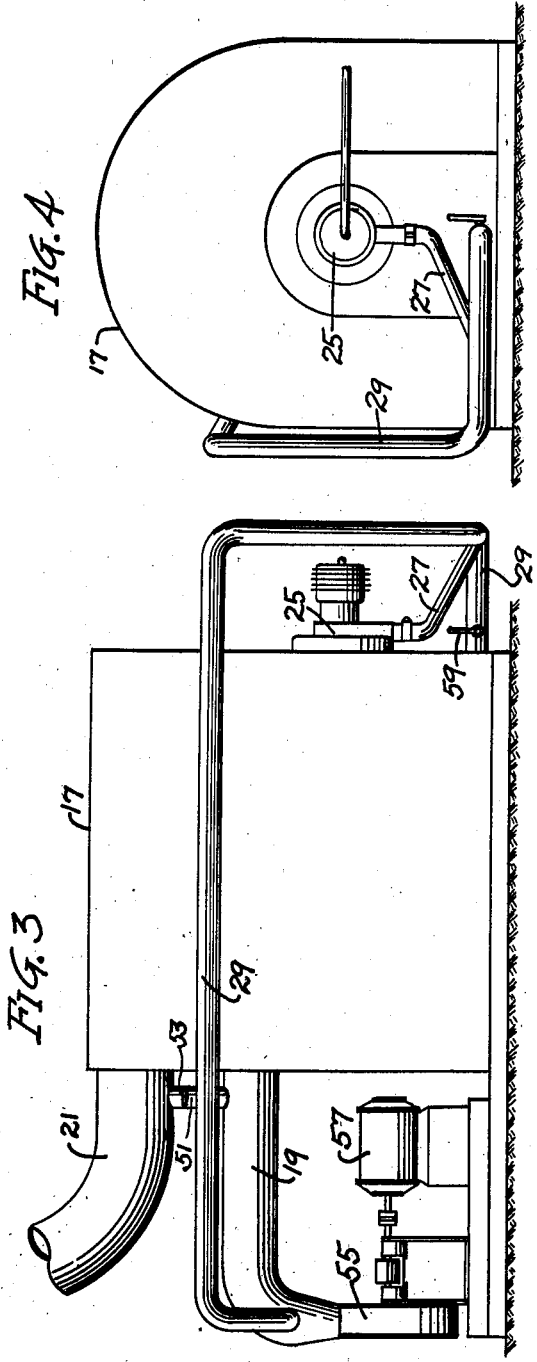

WILBURN W. O'NEAL INVENTORS
ROBERT O. WILLIAMS
BY
J. H. Weatherford
atty

Patented Dec. 7, 1943

2,335,877

UNITED STATES PATENT OFFICE 2,335,877

FURNACE

Wilburn W. O'Neal and Robert D. Williams, Memphis, Tenn.

Application January 17, 1942, Serial No. 427,102

7 Claims. (Cl. 263—19)

This invention relates to improvements in furnaces for heating air, and particularly to such furnaces for heating air under pressure for use in drying leguminous products, grains and other materials requiring relative large quantities, and sharp reduction in temperature, of such air, relatively to the combustion quantities and temperatures of the furnace.

The objects of the invention are:

To make a furnace capable of withstanding internal pressure and adapted to receive and discharge air for combustion, and a major flow of air for drying to be heated directly by, and by mixing with the combustion products of, said furnace.

To provide means in such a furnace for utilizing the drying air for cooling the furnace walls prior to mixing with the products of combustion, whereby to raise the temperature of the drying air by direct radiation from the furnace chamber walls, prior to mixing it with the products of combustion and thereby establishing final discharge temperature.

To provide means for furnishing drying air to said furnace and for by-passing combustion air to a fuel burner for such furnace adapting said burner to function against the internal pressures set up in the furnace.

The means by which the foregoing and other objects are accomplished and the method of their accomplishment will readily be understood from the following specification upon reference to the accompanying drawings, in which:

Fig. 1 is a vertical sectional elevation on the longitudinal center line of the furnace.

Fig. 2 is a transverse sectional elevation taken half on the line II—II and half on the line II—A, II—A of Fig. 1.

Fig. 3 is a side elevation of the furnace and air supply pipes therefor.

Fig. 4 is a corresponding end elevation.

Figure 5:
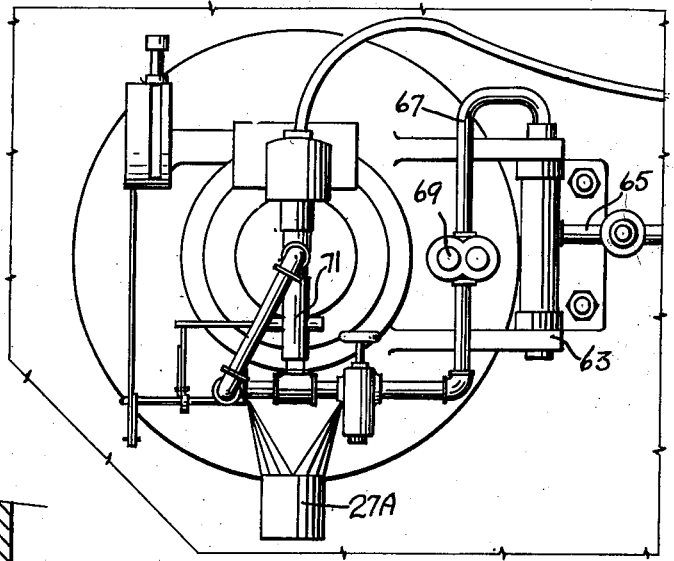
Fig. 5 is an enlarged end elevation of the burner showing the fuel supply and direct air pipe leading thereto.

Referring now to the drawings in which the various parts are indicated by numerals:

The furnace comprises a sealed shell, preferably as of sheet steel, of weight sufficient to stand desired internal pressures to be created and maintained within the furnace by air pressure, the shell comprising front and rear end walls 11, 11—A, a bottom wall 13, side walls 15, and a top wall or arch 17. The shell has air inlet and discharge flues 19 and 21 for drying-air, respectively leading thereinto and therefrom through openings spaced apart in the rear end walls 11—A, and an opening 23 through the opposite end wall 11, the opening being adapted to be closed and sealed against air escape by a fuel burner 25 which is supplied with injection and direct combustion air through an auxiliary pipe 27, which leads from a by-pass pipe 29 connecting the inlet flue 19 with the front of the shell below the burner, for the introduction of auxiliary combustion air into the combustion chamber.

Disposed within the furnace shell is a combustion chamber 31 enclosed by front and rear end walls 33, 33—A, side walls 37, a bottom 35, and a top arch 39, all of refractory material such as fire brick. The walls of the chamber are spaced from the shell to provide a surrounding air space, the end and side walls being centered by projecting bricks or struts 41, preferably at regular intervals and the bottom supported in similar spaced relation to the shell by bricks, preferably in rows 43, disposed to form channelways extending from end to end and connecting into the open spaces at such ends. The chamber arch 39 extends from the chamber front end wall 33 to and past the chamber rear end wall 33—A and into closely abutting relation with the rear end shell wall 11—A, sealing off the entrance flue 19 and the rear end wall space below the arch from the discharge flue 21. The arch 39 is spaced well below the shell arch 17, which preferably is lined with refractory material 45, as fire brick, the two arches coming together along the sides of the furnace to seal off a mixing chamber 47 from which the discharge flue 21 leads from the side wall spaces therebelow. This chamber 47 is in direct communication, at the front end of the furnace, with the space between the furnace walls 33 and the shell 11, and through this space is in direct communication, by means of the rear end and side wall spaces, with the inlet flue 19. The arch 39 is provided with numerous openings 49 through which direct communication is maintained between the furnace chamber 31 and the mixing chamber 47.

The inlet and outlet flues 19 and 21 are connected by a by-pass pipe 51 which is normally closed by a valve 53, here indicated as a slide, which may be partially or fully withdrawn to establish partial or complete by-pass flow between the inlet and outlet flues should it be found advisable to reduce temperature of the drying air temporarily or otherwise.

55 is a pressure blower, driven as by an electric motor 57 for furnishing the drying and combustion air, this blower being connected through the inlet flue 19 with the chamber shell and through the by-pass pipe 29 from this flue into the lower portion of the combustion chamber, and also through the auxiliary pipe 27 leading from this by-pass pipe directly to the burner 25. Flow through the by-pass pipe to the furnace is regulated as by a butterfly valve 59, and through the auxiliary pipe 27 as by a similar valve 61.

Figure 6:
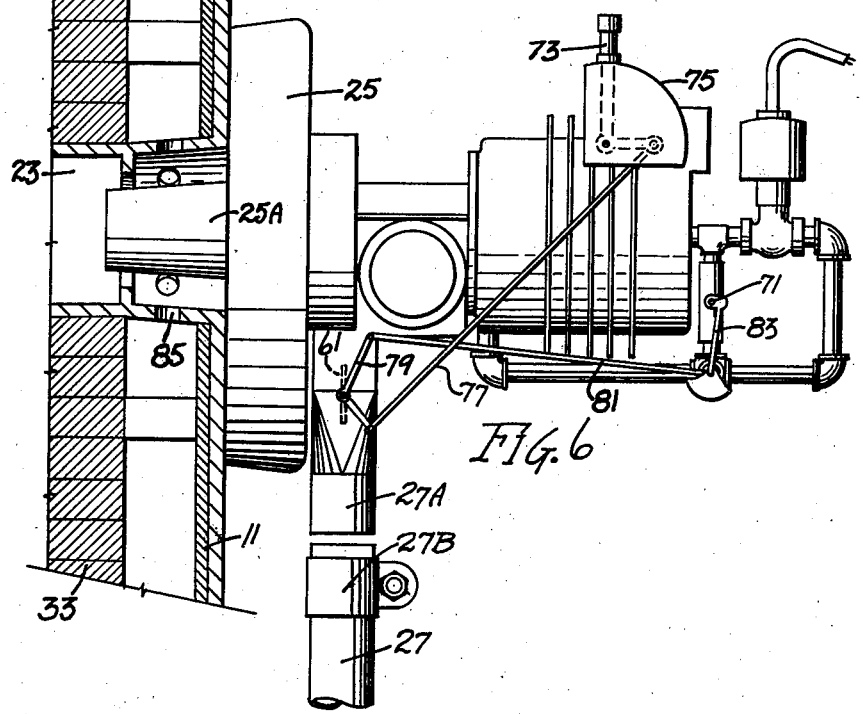
Fig. 6 a side elevation on the same scale showing the fuel supply pipes, the direct air pipe and air auxiliary air pipe to the burner.

The burner 25 is mounted on a hinge 63, the pipe 27, in Fig. 6, being shown disconnected from the portion 27—A leading into the burner to permit movement around the hinge. Connection of the pipe portions is established during operation by a sleeve 27—B which is moved up to cover the junction between the pipes and tightened. Fuel for the burner is furnished from a suitable source of supply through a pipe 65 leading into one of the hinge members, a pipe 67, a pump 69 and suitable piping and valves into the burner, the valves including a regulating valve 71, exteriorly indicated only.

73 is a lever adapted to be manually shifted and set to desired position along an arc 75, the lever being connected through suitable linkage, including a rod 77 to a bell crank lever 79, and through one arm of this lever operatively to the butterfly air valve 61, the opposite arm of the lever 79 being connected through a rod 81 and arm 83 with the fuel regulating valve 71. Air and fuel oil are discharged from the burner 25 through a nozzle 25—A directly into the furnace chamber through the opening 23 and for initial combustion this air is augmented by air flowing through the space between the front shell 11 and the front end 33 of the combustion chamber, this air having access through openings 85 to the outside of the nozzle 25—A and discharging along the outside of such nozzle, also through the opening 23 into the combustion chamber. Additional air for combustion is furnished directly into the combustion chamber 31 through the by-pass pipe 29 and regulated by the valve 59. The products of the combustion in the chamber 31 heat up the walls of the chamber, and escape through the openings 49 in the arch 39 into the mixing chamber 47. Air entering through the flue 19 passes downward through the space between the rear chamber wall 33—A and the rear shell 11—A; thence forward between the corresponding side and bottom passageways and upward through the front end space into the mixing chamber 47 where it mixes with the highly heated combustion gases from the furnace chamber 31. In its passage around the combustion chamber the entering air cools the chamber walls and is itself raised in temperature by the heat absorbed from the walls before reaching the mixing chamber 47. In the mixing chamber it tempers the highly heated gases of combustion and mixed with these gases is discharged through the flue 21.

It will be understood that the proportion of the air used for combustion, and that used for mixing with the products of combustion and absorbing and tempering the heat of combustion, may be largely varied, but that it is presently contemplated, as indicated by the relation of the sizes of the flue 19 and the pipe 29, that the tempering air will be greatly in excess of the combustion air and that the resulting drying air discharged through the flue 21 will be greatly reduced in temperature from the temperature set up in the furnace chamber.

In certain drying operations, such as are disclosed in my pending application, Serial No. 374,212, it is contemplated that the temperature of combustion in the furnace chamber will be around two thousand degrees, whereas the temperature of the drier gases will be of the nature of eight hundred degrees.

We claim:

1. An air heating furnace comprising a shell adapted to withstand internal pressures, a combustion chamber, having enclosing walls including a roof, disposed within said shell and spaced from said shell to provide air spaces substantially completely surrounding said chamber, said space above said roof being enlarged relatively to the other said spaces to form a mixing chamber, said combustion chamber roof extending, at its side edges and one end only, into contact with the sides and one end of said shell to separate said surrounding space, along said end and said sides from said space above said roof, and said roof being honeycombed to establish communication between said combustion and mixing chambers; a fuel burner mounted on the opposite end of said shell and discharging through the adjacent wall of said combustion chamber into said chamber; means for establishing a flow of air under pressure, an inlet flue connecting said pressure flow establishing means into the first named end of said shell and said chamber-surrounding space below said roof, and a discharge flue leading from the same end of said shell and said mixing chamber.

2. An air heating furnace comprising an enclosing shell adapted to withstand internal pressures, a combustion chamber, having enclosing walls, disposed within said shell and spaced therefrom to provide connecting air spaces substantially completely surrounding said chamber, said chamber walls including a top wall honeycombed to establish communication between said chamber and the air space thereabove, means extending along the rear end and sides of said shell and chamber separating said air space above said chamber along said end and said sides from the lower said air spaces, burner means and fuel feed means therefor, mounted on the front end of said shell and discharging through the front wall of said combustion chamber into said chamber; means for establishing a flow of air under pressure, means connecting said flow establishing means into the rear end of said shell below said dividing means, and a discharge flue leading from the rear end of said shell above said dividing means.

3. An air heating furnace comprising an enclosing shell adapted to withstand internal pressures, walls within said shell enclosing a combustion chamber, said walls being spaced from said shell to provide an air space substantially completely surrounding said chamber, the space between the top wall of said chamber and said shell being greatly enlarged relatively to other portions of said air space to establish a mixing compartment, the said top wall of said chamber being apertured to establish communication with said mixing compartment, means dividing said air space along the rear end and sides of said shell and chamber into upper and lower spaces, burner means and fuel feed means therefor mounted on the front end of said shell and discharging through the front wall of said combustion chamber into said chamber; means for establishing a flow of air under pressure, means connecting said flow establishing means through the rear end of said shell into said air space below said dividing means, and a discharge flue leading through the rear end of said shell from said mixing compartment.

4. An air heating furnace including a combustion chamber, having enclosing walls including a roof, means establishing a mixing chamber above said roof, said roof being honeycombed to establish communication between said chambers, fuel burner means having fuel feed means, mounted on and discharging through a wall of said combustion chamber into said combustion chamber, means for establishing a flow of air under pressure, means connecting said pressure flow establishing means into said mixing chamber, and a discharge flue leading therefrom; by-pass means establishing communication between said air flow establishing means and said combustion chamber, and auxiliary means connecting said air flow establishing means with said burner means to establish injection flow of air through said burner means into said combustion chamber.

5. An air heating furnace comprising an enclosing shell adapted to withstand internal pressures, a combustion chamber having enclosing walls, disposed within said shell and spaced below the top of said shell to provide a mixing chamber, said combustion chamber walls including a top wall, apertured to establish communication with said mixing chamber, burner means and fuel feed means therefor mounted on a wall of said shell and discharging through an adjacent wall of said combustion chamber into said combustion chamber; means for establishing a flow of air under pressure, means connecting said flow establishing means to said mixing chamber to establish a traversing flow of air therethrough, a discharge flue leading from said mixing chamber, by-pass means establishing communication between said flow establishing means and said combustion chamber, and auxiliary by-pass means connecting said flow establishing means with said burner means to establish injection flow of air therethrough.

6. An air heating furnace including a combustion chamber, having enclosing walls including a roof, means including said roof establishing an air chamber above said roof, said roof being honeycombed to establish communication between said chambers, fuel burner means having fuel feed means mounted on said chamber and discharging thereinto, means for establishing a flow of air under pressure, an inlet flue connecting said air flow means into said air chamber, and a discharge flue leading therefrom; by-pass means establishing communication between said inlet flue and said combustion chamber, and auxiliary means connecting said by-pass means with said burner means to establish injection flow of air through said burner means into said combustion chamber.

7. An air heating furnace including a combustion chamber, having enclosing walls including a roof, means including said roof establishing an air chamber above said roof, said roof being honeycombed to establish communication between said chambers, fuel burner means having fuel feed means mounted on said chamber and discharging thereinto, means for establishing a flow of air under pressure, means connecting said pressure flow establishing means into said air chamber, and a discharge flue leading from said chamber; by-pass means establishing communication between said flow establishing means and said combustion chamber, and auxiliary means establishing communication between said flow establishing means and said burner means to establish injection flow of air through said burner means into said combustion chamber.

WILBURN W. O'NEAL.
ROBERT D. WILLIAMS.